US 7,292,226 B2

(12) United States Patent
Matsuura et al.

(10) Patent No.: US 7,292,226 B2
(45) Date of Patent: Nov. 6, 2007

(54) CHARACTER INPUT APPARATUS

(75) Inventors: Hiroshi Matsuura, Tokyo (JP);
Kenichi Koga, Ome (JP); Akira Nakayama, Akishima (JP)

(73) Assignees: Kabushiki Kaisha Toshiba, Tokyo (JP); Toshiba Digital Media Engineering Corporation, Ome-shi (JP)

( * ) Notice: Subject to any disclaimer, the term of this patent is extended or adjusted under 35 U.S.C. 154(b) by 667 days.

(21) Appl. No.: 10/744,779

(22) Filed: Dec. 24, 2003

(65) Prior Publication Data

US 2004/0196266 A1    Oct. 7, 2004

(30) Foreign Application Priority Data

Dec. 27, 2002   (JP)   ............... 2002-381379

(51) Int. Cl.
G06F 3/02       (2006.01)
G09G 5/00       (2006.01)
(52) U.S. Cl. ................. 345/168; 345/173; 715/863
(58) Field of Classification Search ........ 345/168–179; 715/863
See application file for complete search history.

(56) References Cited

U.S. PATENT DOCUMENTS 5,881,169 A * 3/1999 Henry, Jr. ............... 382/187

FOREIGN PATENT DOCUMENTS

| CN | 1030836 A | 2/1989 |
| JP | 63-82589 | 4/1988 |
| JP | 63-136290 | 6/1988 |
| JP | 3-40016 | 2/1991 |
| JP | 5-12494 | 1/1993 |
| JP | 2002-203208 | 7/2002 |

* cited by examiner

Primary Examiner—Amr A. Awad
Assistant Examiner—Michael Pervan
(74) Attorney, Agent, or Firm—Oblon, Spivak, McClelland, Maier & Neustadt, P.C.

(57) ABSTRACT

A character input apparatus includes a key-in unit configured to input a character by a keystroke, a writing input unit to input a character by writing, a storage to store character strings, and a control unit to control the storage to store, in the storage, a first character input by the key-in unit and a second character input by the writing input unit in a form of a single character string including the first character and the second character.

12 Claims, 10 Drawing Sheets

| Key and writing | Number of strokes |
|---|---|
| き [2ABCか][2ABCか] | 2 |
| ょ [8TUVや][8TUVや][8TUVや][8TUVや][8TUVや][8TUVや] | 6 |
| う [1あ][1あ][1あ] | 3 |
| は [6MNOは] | 1 |
| Conversion ▼ | 1 |
| Determination ▶ | 1 |
| 2 | 1 |
| か [2ABCか] | 1 |
| ゛ [#゛°] | 1 |
| つ [4GHIた][4GHIた][4GHIた] | 3 |
| Conversion ▼ | 1 |
| Determination ▶ | 1 |
| 3 | 1 |
| に [5JKLな][5JKLな] | 2 |
| ち [4GHIた][4GHIた] | 2 |
| ▶ | 1 |
| て [4GHIた][4GHIた][4GHIた][4GHIた] | 4 |
| ゛ [#゛°] | 1 |
| す [3DEFさ][3DEFさ][3DEFさ] | 3 |
| Conversion ▼ | 1 |
| Determination ▶ | 1 |
| | Total 38 |

Input order

| Key and writing | | Number of strokes |
|---|---|---|
| 今 | 今 | 4 |
| 日 | 日 | 4 |
| は | は | 3 |
| 2 | [2 か ABC] | 1 |
| 月 | 月 | 4 |
| 3 | [3 さ DEF] | 1 |
| 日 | 日 | 4 |
| で | で | 3 |
| す | す | 2 |
| | | Total 26 |

Input order

FIG. 9

| Key and writing | | Number of strokes |
|---|---|---|
| T | T | 2 |
| o | o | 1 |
| d | d | 1 |
| a | a | 1 |
| y | y | 2 |
| ⌴ | SPACE | 1 |
| i | \ | 2 |
| s | S | 1 |
| ⌴ | SPACE | 1 |
| F | F | 3 |
| e | e | 1 |
| b | b | 1 |
| r | r | 1 |
| u | u | 1 |
| a | a | 1 |
| r | r | 1 |
| y | y | 2 |
| 3 | 3 DEF | 1 |
| . | # | 1 |
| | | Total 25 |

Display: Today is February 3.

Input order

FIG. 10

| Key and writing | | | | Number of strokes |
|---|---|---|---|---|
| T  8 や TUV | 8 や TUV | 8 や TUV | 8 や TUV | 4 |
| o  6 は MNO | 6 は MNO | 6 は MNO | | 3 |
| d  3 さ DEF | | | | 1 |
| a  2 か ABC | | | | 1 |
| y  9 ら WXYZ | 9 ら WXYZ | 9 ら WXYZ | | 3 |
| ␣  SPACE | | | | 1 |
| i  4 た GHI | 4 た GHI | 4 た GHI | | 3 |
| s  7 ま PQRS | 7 ま PQRS | 7 ま PQRS | 7 ま PQRS | 4 |
| ␣  SPACE | | | | 1 |
| F  3 さ DEF | 3 さ DEF | 3 さ DEF | | 6 |
|    3 さ DEF | 3 さ DEF | 3 さ DEF | | |
| e  3 さ DEF | 3 さ DEF | | | 2 |
| b  2 か ABC | 2 か ABC | | | 2 |
| r  7 ま PQRS | 7 ま PQRS | 7 ま PQRS | | 3 |
| u  8 や TUV | 8 や TUV | | | 2 |
| a  2 か ABC | | | | 1 |
| r  7 ま PQRS | 7 ま PQRS | 7 ま PQRS | | 3 |
| y  9 ら WXYZ | 9 ら WXYZ | 9 ら WXYZ | | 3 |
| 3  3 | | | | 1 |
| .  # ゛ ゜ | | | | 1 |
| | | | Total | 45 |

Input order

Display (2): Today is February 3.

FIG. 11

CHARACTER INPUT APPARATUS

CROSS-REFERENCE TO RELATED APPLICATIONS

This application is based upon and claims the benefit of priority from the prior Japanese Patent Application No. 2002-381379, filed Dec. 27, 2002, the entire contents of which are incorporated herein by reference.

BACKGROUND OF THE INVENTION

1. Field of the Invention

The present invention relates to a character input apparatus of, e.g., a mobile phone having as inputting means a tablet which directs a position by using a pen or a finger, a portable information device or an information household electric appliance which includes a function to input characters such as a PDA (Personal Digital Assistant), a barcode reader or a POS (Point Of Sales) terminal, and others.

2. Description of the Related Art

Conventional character input apparatuses are configured to include either a method of inputting characters by key operations or a method of inputting characters by drawing through a tablet. Since each of the methods has good points and bad points, the conventional character input apparatuses have a problem in convenience of inputting characters for users.

BRIEF SUMMARY OF THE INVENTION

In order to solve the above-described problem, it is an object of the present invention to provide a character input apparatus which can perform both character input by key operations and character input by drawing and has the high convenience.

According to a first aspect of the invention, there is provided a character input apparatus which generates character string data, comprising: key-in means for inputting a character by a keystroke; writing input means for inputting a character by writing; means for storing character strings; and control means for controlling the storing means to store a first character input by the key-in means and a second character input by the writing input means in the storing means in a form of a single character string including the first character and the second character.

DETAILED DESCRIPTION OF THE INVENTION

An embodiment according to the present invention will now be described hereinafter with reference to the accompanying drawings. Here, a description will be given as to a mobile phone taken as an example including a character input apparatus according to the present invention.

Figure 1:
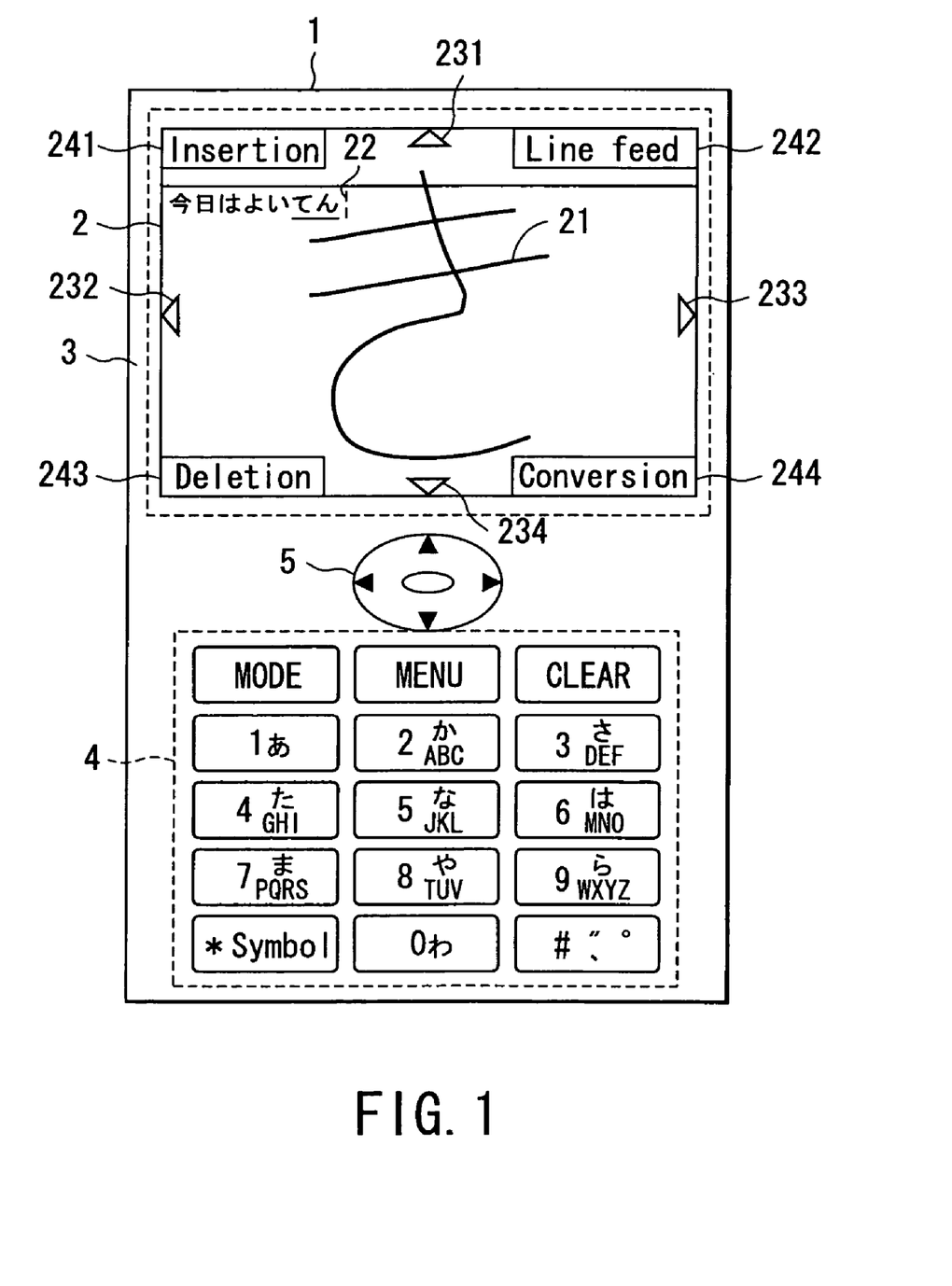
FIG. 1 is a view showing a structure of an external appearance of a mobile phone in an embodiment of a character input apparatus according to the present invention.

FIG. 1 is a view showing an exterior appearance of the mobile phone. As main constituent elements of the exterior appearance, this mobile phone as an apparatus main body 1 includes a display device 2 capable of displaying sentences or handwritings, software keys and the like, a coordinate detecting unit 3 which is provided on a screen of the display device 2 and detects a position pressed by a user as a coordinate value, a key group 4 which includes a plurality of keys for inputting data by a keystroke and accepts instructions such as input of figures or characters, mode switching, deletion of inputted information, display of a menu or the like, and a multi-function key 5 which can accept instructions with the directionality such as movement of a cursor, selection or determination from a menu list and others.

Further, the coordinate detecting unit 3 has been described as a unit to detect a coordinate of a position pressed by a user, but the present invention is not restricted thereto, and any units can be applied to the embodiment according to the present invention as long as it has a structure to detect a coordinate of a graphic written by a user.

The display device 2 and the coordinate detecting unit 3 have coordinate planes having substantially the same dimension. Furthermore, the coordinate detecting unit 3 is superposed on and integrated with the display device 2 on the apparatus main body 1 as shown in, e.g., FIG. 2. As a result, the display device 2 and the coordinate detecting unit 3 comprise a transparent tablet.

Figure 2:
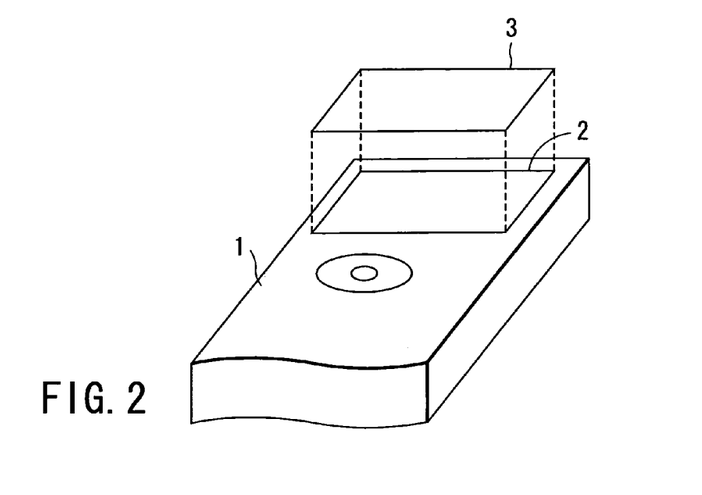
FIG. 2 is a view showing a positional relationship between a main body device, display and coordinate detecting means of the mobile phone depicted in FIG. 1.

The display device 2 can display information of, e.g., a handwriting 21, a character input cursor 22, cursor movement software keys 231 to 234, software keys 241 to 244 and the like.

When the cursor movement software keys 231 to 234 are operated by the control of a character input control unit 17 and a display control unit 18 which will be described later, the character input cursor 22 moves in upper, lower, right and left directions like a case when the multi-function key 5 is operated. As to the cursor movement software keys 231 to 234, only those corresponding to the directions in which the input position cursor 22 can move are displayed by the control of the character input control unit 17 and the display control unit 18.

Moreover, the software keys 241 to 244 are displayed at predetermined positions in an outer peripheral portion of the screen so as not to overlap a screen central part which functions as both a character display area and a handwriting input area. Various functions used for dynamic sentence input such as insertion of a space, insertion of a line feed, deletion of characters, "kana" to "kanji" conversion and others can be assigned to these software keys 241 to 244.

Figure 3:
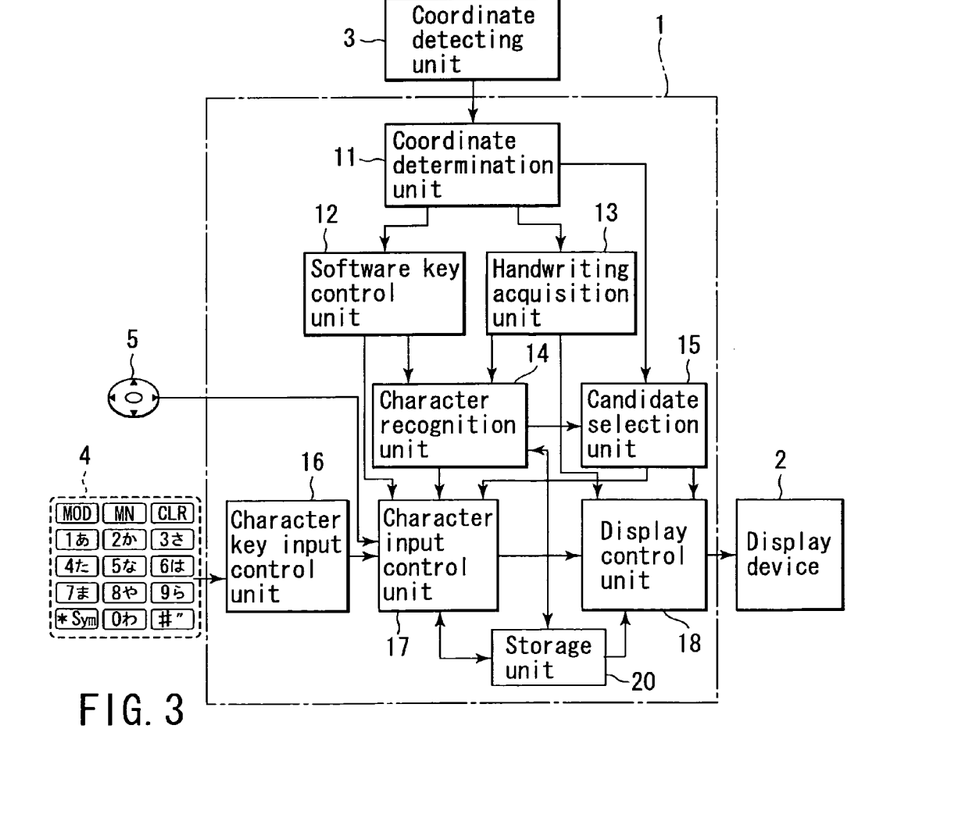
FIG. 3 is a circuit block diagram showing an internal structure of the mobile phone depicted in FIG. 1.

FIG. 3 is a circuit block diagram of the mobile phone. It is to be noted that this drawing mainly shows a structure concerning a character input apparatus according to the present invention. Known structures such as a wireless unit which radio-communicates with a base station of a mobile phone system, an audio processing unit which controls audio signals, a control unit which collectively controls these units and realizes an audio communication, a microphone or a speaker are omitted for simplification of description.

The apparatus main body 1 includes a coordinate determination unit 11, a software key control unit 12, a handwriting acquisition unit 13, a character recognition unit 14, a candidate selection unit 15, a character key input control unit 16, a character input control unit 17, a display control unit 18 and a storage unit 20.

The coordinate determination unit 11 acquires a coordinate value from the coordinate detecting unit 3, and determines a position pressed by a user on a display area of the display device 2 based on this value. Additionally, the coordinate determination unit 11 selectively outputs the coordinate value acquired from the coordinate detecting unit 3 to the software key control unit 12, the handwriting acquisition unit 13 or the candidate selection unit 15 in accordance with the determined position.

The software key control unit 12 controls display/erasure of the software keys on the display device 2. Further, the software key control unit 12 determines which software key was pressed based on the coordinate value supplied from the coordinate determination unit 11. Furthermore, the software key control unit 12 outputs data corresponding to the pressed software key to the character input control unit 17 as a user request.

The handwriting acquisition unit 13 qualifies a track pressed and drawn by a user, i.e., information of continuous coordinate values as a scar of a handwritten character and detects it based on coordinate values supplied from the coordinate determination unit 11. Moreover, the handwriting acquisition unit 13 outputs the detected handwriting, i.e., the information of continuous coordinate values to the character recognition unit 14 and the display control unit 18 as track information.

The character recognition unit 14 analyzes the track information outputted from the handwriting acquisition unit 13, and detects characters which can possibly correspond to this information from a later-described storage unit 20. Then, the character recognition unit 14 outputs identification information of a character which can correspond to the information with the highest possibility among the detected characters to the character input control unit 17 as first candidate character information. Additionally, when a plurality of characters which may correspond to the information exist, the character recognition unit 14 outputs information used to respectively identify these characters to a candidate selection unit 15 as recognized candidate information.

The candidate selection unit 15 outputs to the display control unit 18 the recognized candidate information outputted from the character recognition unit 14. Further, the candidate selection unit 15 determines which one of the characters as the recognized candidates displayed on the display device 2 is one that a user is going to input based on a determined result of the coordinate determination unit 11. Then, the candidate selection unit 15 outputs to the character input control unit 17 information used to identify a character the user is going to input as character information based on this determined result.

A character key input control unit 16 determines an input request from the user through the key group 4, and accepts a setting for switching a character type to be inputted or character information according to this setting. Then, the character key input control unit 16 outputs the accepted character information to the character input control unit 17.

The character input control unit 17 performs controls concerning edition of various sentences such as conversion of an inputted character string in accordance with the character information outputted from the character recognition unit 14, the candidate selection unit 15 or the character key input control unit 16 or the user request accepted in the software key control unit 12 or the character key input control unit 16.

The display control unit 18 displays on the display device 2 a sentence or a characters edited by the character input control unit 17, a handwriting acquired from the handwriting acquisition unit 13, a software key drawn by the software key control unit 12, and characters based on the identification information outputted from the candidate selection unit 15 in accordance with an instruction from the character input control unit 17.

The storage unit 20 includes a storage area which stores drawing data such as characters or software keys and various control data or sentences created by the character input control unit 17, or a working area which temporarily stores information in order to execute controls concerning editing of sentences by the character input control unit 17.

An operation of the mobile phone having the above-described structure will now be described. Here, the explanation about essential operations of the mobile phone such as an operation concerning the wireless communication performed with a base station device of a mobile phone system is eliminated, and an operation concerning character input will be described.

Figure 4:
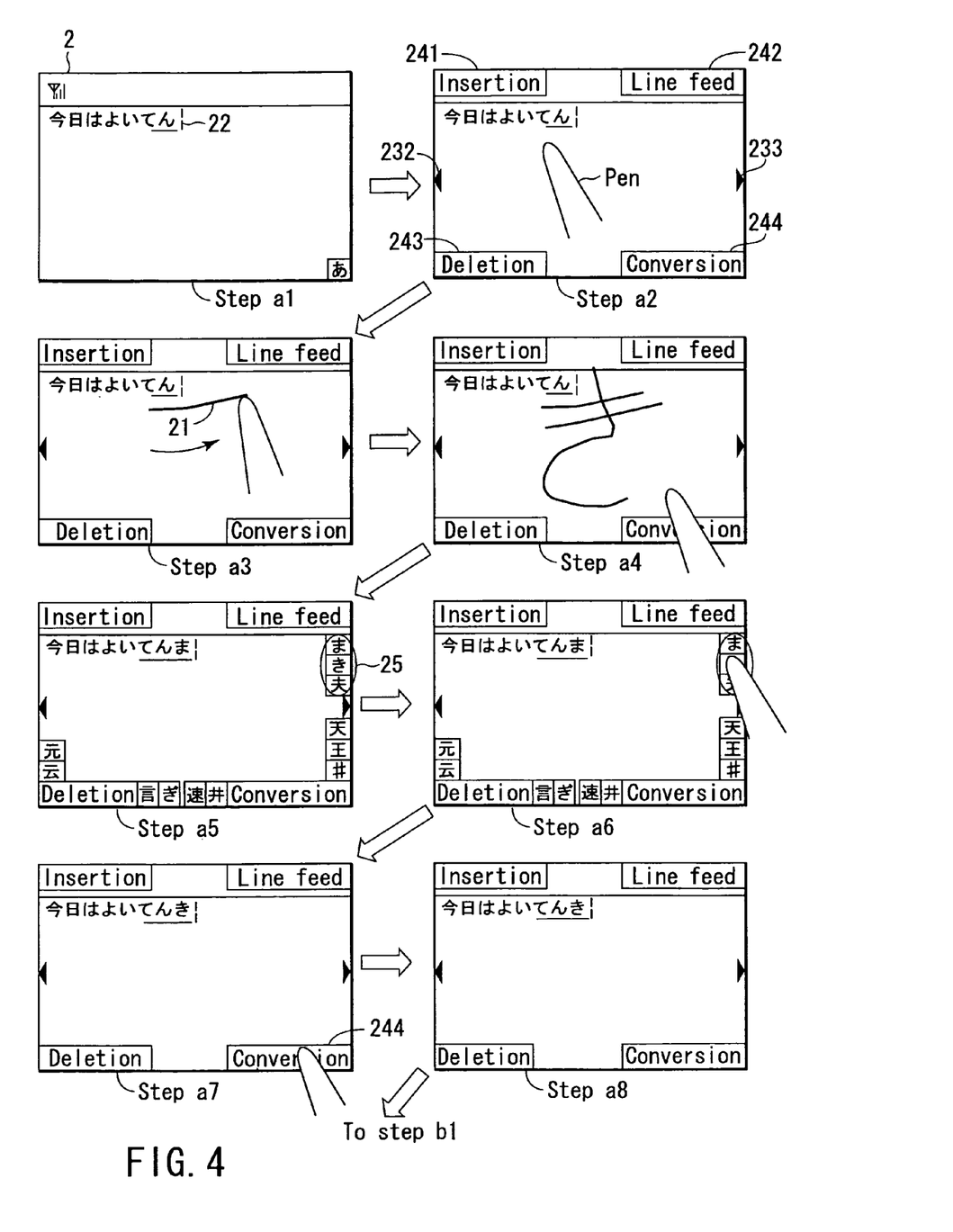
FIG. 4 is a view illustrating a character input operation of the mobile phone depicted in FIG. 1.

An example of an operation to input Japanese characters by handwriting input will be explained with reference to FIG. 4. The character input control unit 17 supplies a command to the display control unit 18. As a result, as shown at a step a1, the display control unit 18 displays an input position cursor 22 on the display device 2, additionally displays characters at a position of the input position cursor 22 when characters are inputted, and moves the input position cursor 22 to the right-hand side by an amount corresponding to one character.

Further, when a command instructing a movement in one of the upward, downward, right and left directions is supplied from a user through the multi-function key 5, the character input control unit 17 supplies the command to the display control unit 18 and causes it to move and display a position of the character input cursor 22 in a direction corresponding to the command. As a result, it is possible to specify a position where characters are inputted, deletion, a target to be copied and others.

Here, as shown at a step a2, when a user starts writing by pressing the display means 2 through a pen or fingers, the coordinate detecting unit 3 superposed on the display device 2 detects a pressed coordinate. The coordinate determination unit 11 is notified of this detected coordinate.

The coordinate determination unit 11 determines the position pressed by the user from the coordinate notified from the coordinate detecting unit 3. Then, the coordinate determination unit 11 outputs a value of the coordinate to the software key control unit 12, the handwriting acquisition unit 13 or the candidate selection unit 15 in accordance with the determined position.

Here, if the determined position is not a coordinate of a software key, the coordinate value supplied from the coordinate detecting unit 3 is outputted to the handwriting acquisition unit 13. On the other hand, the handwriting acquisition unit 13 detects a handwriting of a user based on the coordinate value supplied from the coordinate determination unit 11.

For example, as shown at a step a3, when the pen moves on the display device 2 being pressed, the coordinate determination unit 11 sequentially outputs pressed coordinates to the handwriting acquisition unit 13, and the handwriting acquisition unit 13 detects a handwriting 21 of a user from the pressed coordinates.

In this manner, the handwriting acquisition unit 13 receives information of the pressed coordinates from the coordinate determination unit 11, and stores the handwriting inputted by a user as a stroke coordinate string. Furthermore, this coordinate string is fed to the display control unit 18, and the display control unit 18 displays it as a handwriting on the screen of the display device 2 based on this.

Then, as shown at a step a4, when writing is performed by repeating pressing and interruption of pressing with respect to the display device 2, the coordinate determination unit 11 detects the interruption of pressing, and the coordinate determination unit 11 notifies it to the handwriting acquisition unit 13. The handwriting acquisition unit 13 judges end of one stroke of writing input from this notification, and activates a timer.

When the next pressing is carried out before the time-out of the timer, the handwriting acquisition unit 13 assumes that input of one character is yet to be finished, and continuously accepts input. When the time-out of the timer occurs, the hand writing acquisition unit 13 assumes that the inputted handwriting is one character, and supplies it to the character recognition unit 14 as one set of handwriting data. On the other hand, the character recognition unit 14 starts recognition of the written and inputted character based on the handwriting data.

It is to be noted that using "Online Character Recognition Apparatus and Method, Computer-readable Storage Medium, and Online Character Recognition Program" disclosed in Japanese patent application KOKAI publication No. 2002-203208 can automatically judge input of each character without using a timer and sequentially recognize characters.

Moreover, the character recognition unit 14 analyzes the acquired handwriting data, and detects a plurality of characters which may possibly correspond to this data from information stored in the storage unit 20. Identification information of the detected characters is outputted to the candidate selection unit 15 as recognized candidate information, and a character with a highest matching degree among these candidates is outputted to the character input control unit 17 as character information of a first candidate (step a5).

It is to be noted that recognition of characters performed in the character recognition unit 14 can be realized by using conventionally known various techniques such as a method of performing matching in units of stroke or a method of performing matching with a reference pattern as an image.

The candidate selection unit 15 outputs the recognition candidate information outputted from the character recognition unit 14 to the display control unit 18. On the other hand, as shown at a step a5 in FIG. 4, the display control unit 18 displays the recognized candidates in recognized candidate areas 25 in a screen peripheral portion so as not to overlap the character display area which also functions as the handwriting input area at the screen center and any other software keys.

When these recognized candidate areas 25 are pressed by the pen or fingers (step a6), the coordinate determination unit 11 detects and notifies it to the candidate selection unit 15, and the candidate selection unit 15 notifies the touched selected candidate to the character input control unit 17.

As a result, the character input control unit 17 controls the display control unit 18, and displays the selected candidate newly notified from the candidate selection unit 15 in place of the presciently supplied first candidate, and eliminates the display of the recognized candidate areas 25 (step a7).

Thereafter, when the software key 244 indicative of "conversion" is touched by the pen or fingers (step a7), the coordinate determination unit 11 detects and notifies it to the software key control unit 12.

On the other hand, the software key control unit 12 instructs the character input control unit 17 to execute the function "conversion" assigned to the touched software key 244. In response to this, the character input control unit 17 converts the undetermined character string from "kana" to "kanji". Then, the character input control unit 17 displays a result of this conversion as a conversion candidate 26 by controlling the display control unit 18 (step a8).

Thereafter, in execution of such a handwriting input mode (step b1 in FIG. 5), i.e., when there is an undetermined character string and any one in the key group 4 is pressed, the character input control unit 17 determines the conversion candidate 26 upon detecting the pressing, and displays it as a determined character string 27 by controlling the display control unit 18 (step b2).

Figure 5:
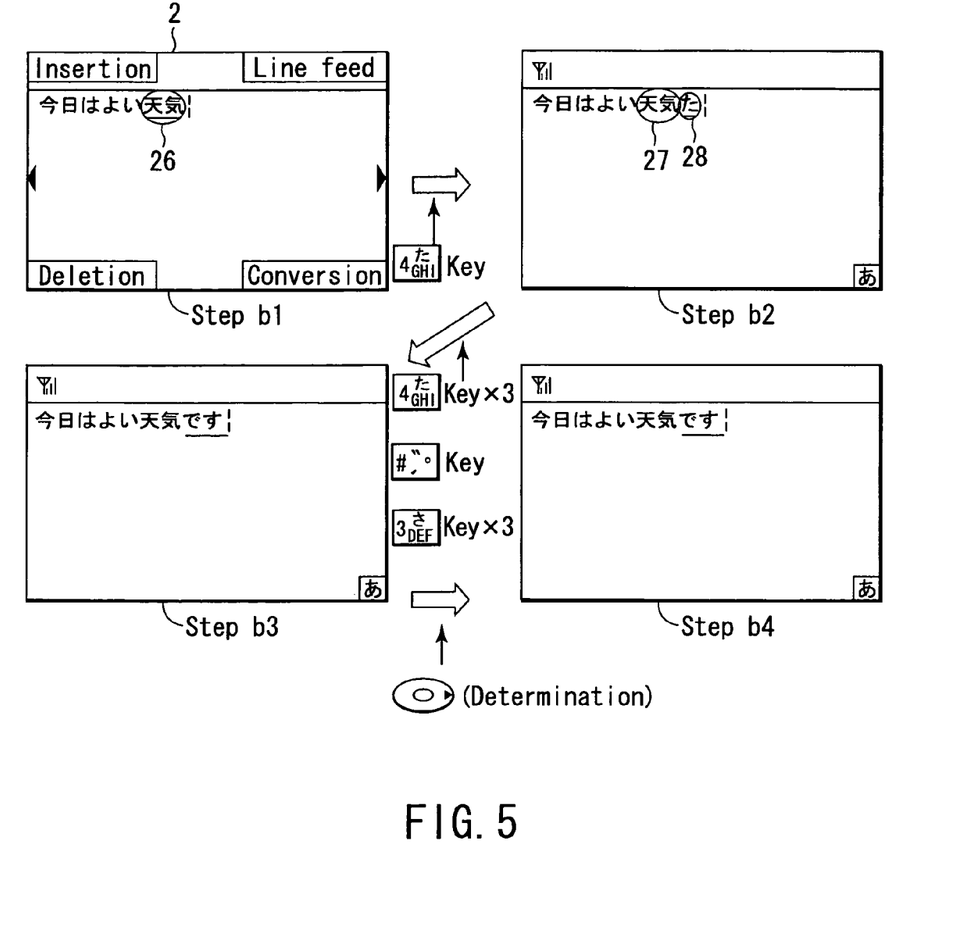
FIG. 5 is a view illustrating a character input operation of the mobile phone depicted in FIG. 1.

Furthermore, the character input control unit 17 displays a character 28 corresponding to the pressed key in the key group 4 by controlling the display control unit 18 (step b2). When any one in the key group 4 is pressed in the handwriting input mode in this manner, the character input control unit 17 detects this state and switches the input mode from the handwriting input mode to the key input mode.

When the input mode is switched to the key input mode, the character input control unit 17 erases the software keys 241 to 244 and 231 to 234 for the handwriting input mode from the screen by controlling the display control unit 18, thereby assuring a large display area for character input (step b2).

Then, when key input is performed through the key group 4, the character input control unit 17 sequentially accepts input of a character string through the key group 4 (step b3). For example, when a command "determine" is supplied from the multi-function key 5, an undetermined character string is determined (step b4).

Thereafter, when a user presses the display device 2 and inputs a coordinate, the character input control unit 17 again switches the input mode from the key input mode to the handwriting input mode. Moreover, as described above in connection with FIG. 4, the character input control unit 17 causes the coordinate detecting unit 3 to detect an inputted coordinate and notify it to the coordinate determination unit 11. Additionally, the coordinate determination unit 11 determines the coordinate, and outputs a value of the coordinate to the software key control unit 12, the handwriting acquisition unit 13 or the candidate selection unit 15 in accordance with a result of this judgment.

As described above, in the mobile phone having the above-described structure, when a user presses the display device 2 and a coordinate is inputted, the input mode is switched from the key input mode to the handwriting input mode, and input of characters or a request of editing is accepted by the handwriting input. Further, then, when any one in the key group 4 is pressed, the input mode is switched from the handwriting input mode to the key input mode, and input of characters or a request of editing is accepted. The thus inputted characters or edited sentences are stored in the storage unit 20 by the character input control unit 17.

It is to be noted that the character key input control unit 16 holds settings of character types inputted through the key group 4 even if the input mode is switched from the key input mode to the handwriting input mode. When the input mode is again switched from the handwriting input mode to the key input mode, input of keys is accepted with the held settings of character types unless a further request to switch a character type is issued from a user.

A description will now be given as to an operation when creating a sentence in which a plurality of types of characters are used while switching between the handwriting input mode and the key input mode. Inputting a sentence in which both Japanese language and Arabic numerals are used is taken as an example with reference to FIG. 6.

Figure 6:
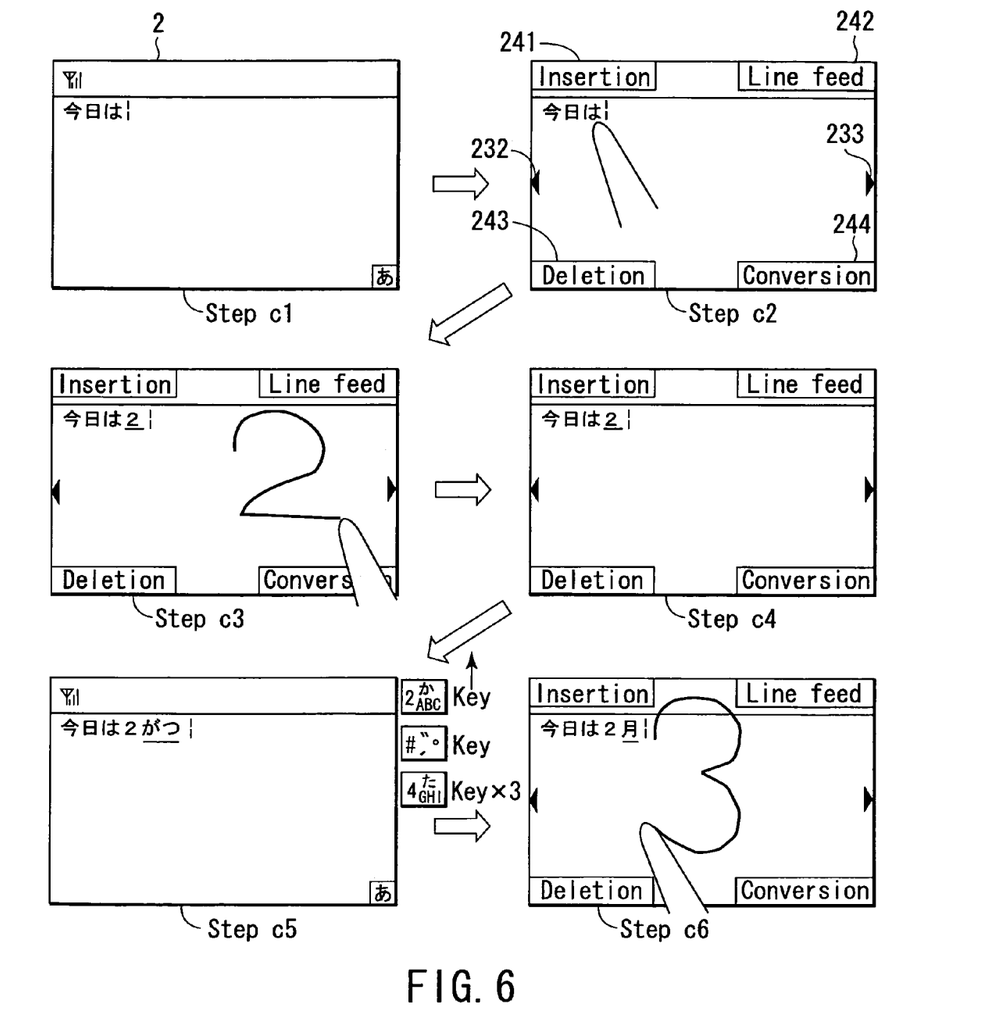
FIG. 6 is a view illustrating a character input operation of the mobile phone depicted in FIG. 1.

At a step c1 in FIG. 6, a Japanese character string including three characters has been already inputted by key input and it is displayed in the display device 2 in the determined state. In such a key input mode, when writing is started by using the pen or fingers, the input mode is switched to the handwriting input mode as described above, and the handwriting is acquired by the coordinate determination unit 11 and the handwriting acquisition unit 13 (step c2).

When the input mode is switched to the handwriting input mode in this manner, the character input control unit 17 displays the software keys 241 to 244 and 231 to 234 by controlling the display control unit 18. Then, when "2" is written and inputted (step c3), the character recognition unit 14 performs character recognition with respect to an inputted track, thereby accepting the character input (step c4).

When the key input is again performed here, the character input control unit 17 accepts this input, the input mode returns to the key input mode (step c5), an undetermined character is determined, input of "2" is completed, and the character input is accepted by the key input.

When the input mode is switched to the key input mode in this manner, the character input control unit 17 erases the software keys 241 to 244 and 231 to 234 for the handwriting input mode from the screen by controlling the display control unit 18, thereby assuring a large display area during the character input.

Furthermore, when writing is restarted (step c6), the character input control unit 17 accepts this, the input mode returns to the handwriting input mode, and the handwriting is acquired by the coordinate determination unit 11 and the handwriting acquisition unit 13. When the input mode returns to the handwriting input mode, the character input control unit 17 displays the software keys 241 to 244 and 231 to 234 by controlling the display control unit 18.

In the handwriting character input, the same character type as that in the key input mode and different character types can be arbitrarily inputted irrespective of a character type set at the time of key input as described above. Therefore, a character type does not have to be switched at the time of key input, and hence the efficient input can be performed.

Now, the number of key strokes and the number of writing strokes will be compared with each other based on various input techniques in case of performing input while switching between the handwriting input mode and the key input mode.

Figure 7:
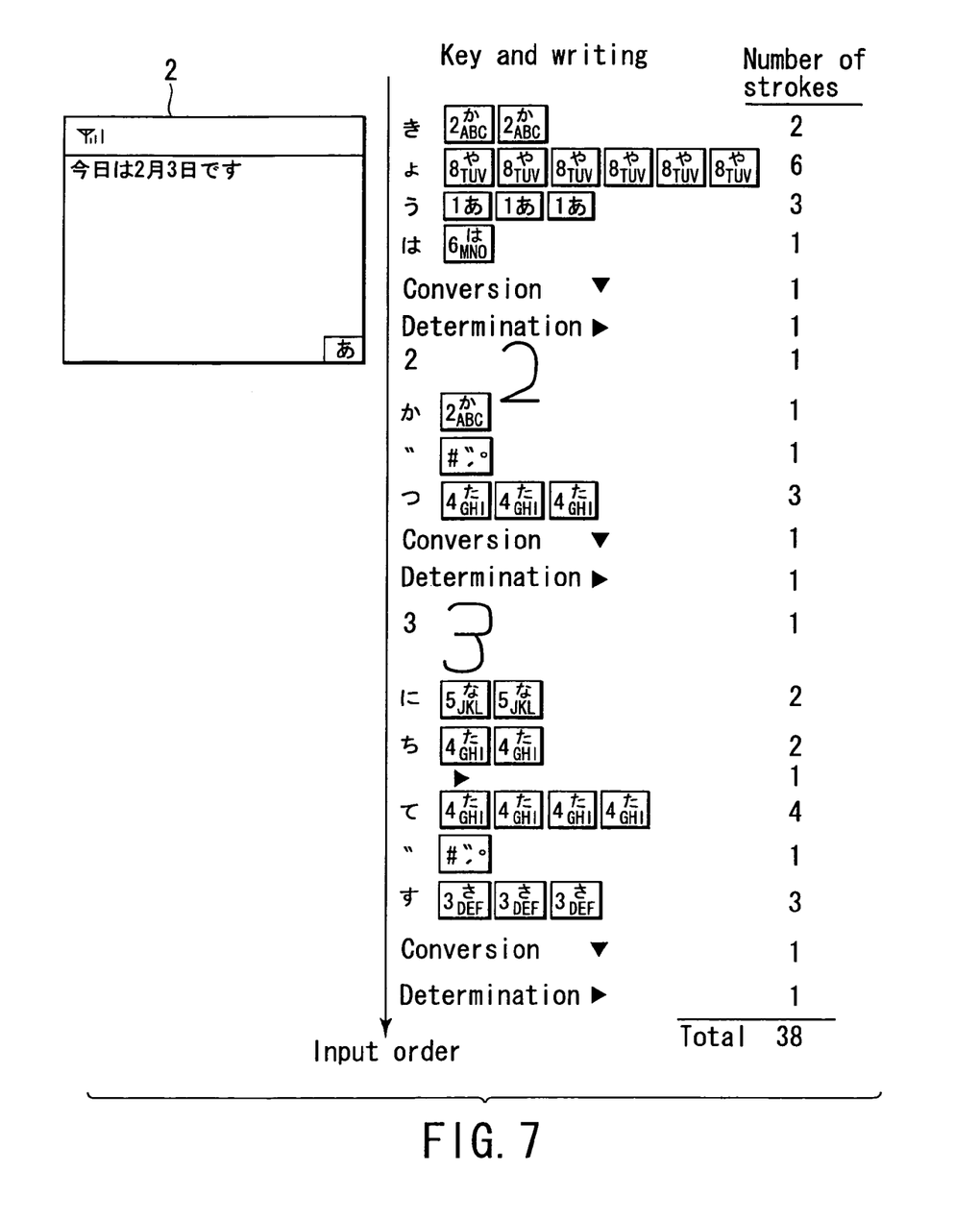
FIG. 7 is a view illustrating the number of strokes required for character input by the mobile phone depicted in FIG. 1.

First, FIG. 7 shows a user operation when Arabic numerals are inputted by handwriting recognition and any other Japanese characters are inputted by using keys.

In this case, the total number of strokes including both the key strokes and the writing stokes is 38. That is, in the mobile phone having the above-described structure, as compared with 52 strokes when all characters are inputted by using keys, the burden on the operation can be reduced by 14 strokes corresponding to the character type switching operation.

Figure 8:
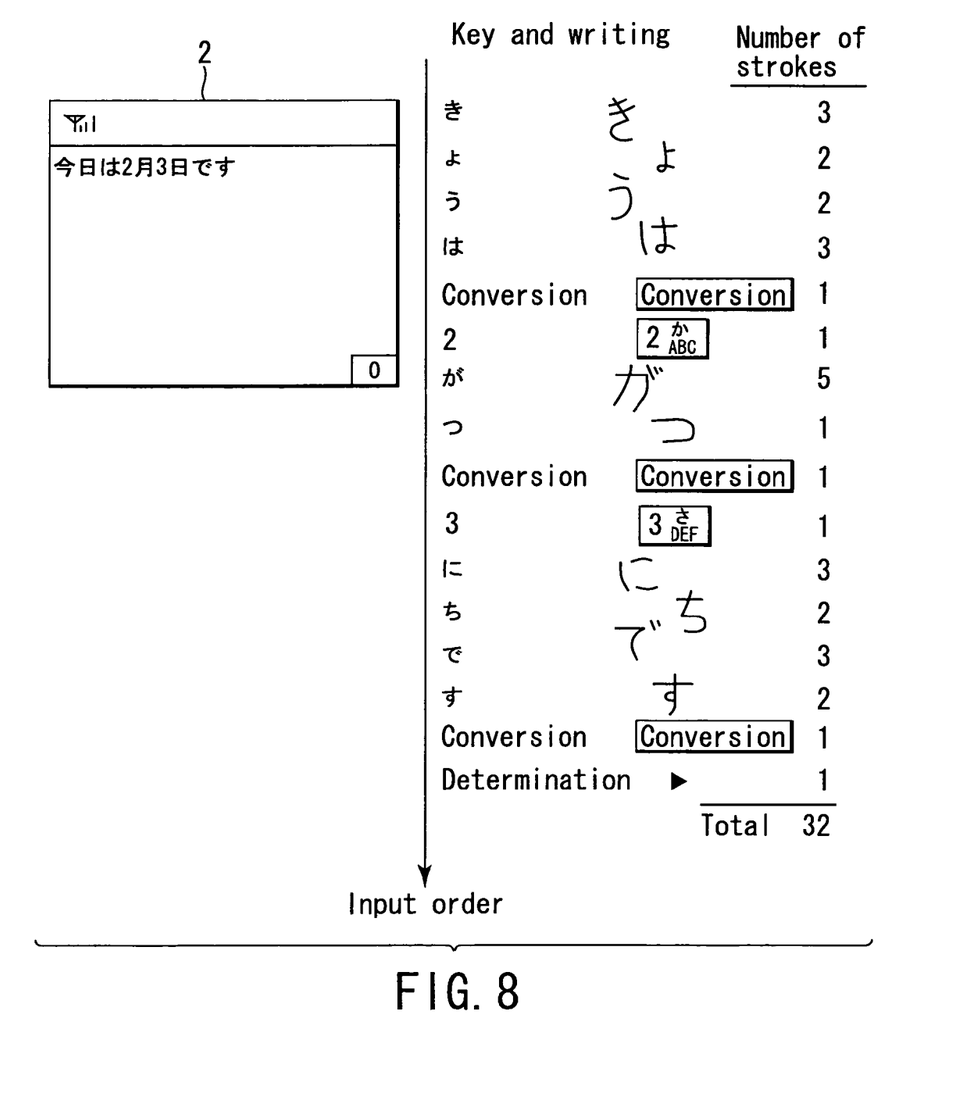
FIG. 8 is a view illustrating the number of strokes required for character input by the mobile phone depicted in FIG. 1.

On the other hand, FIG. 8 shows a user operation when Arabic numerals are inputted by using keys and any other Japanese characters are inputted by handwriting.

In this case, a part of a sentence is inputted in "hiragana" by handwriting character input, and then converted into "kanji". In such a case, the total number of strokes including both the key strokes and the writing strokes is 32, and hence the number of strokes can be further reduced.

Figure 9:
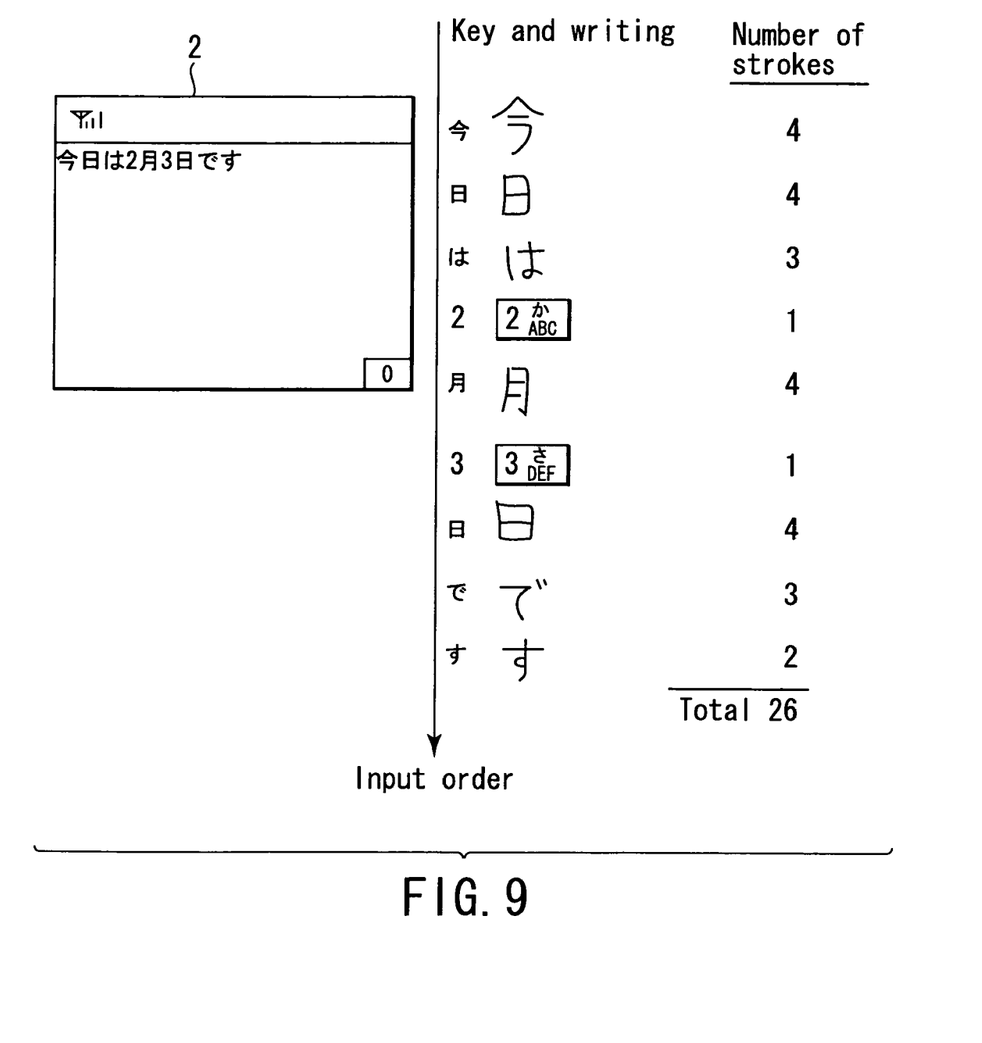
FIG. 9 is a view illustrating the number of strokes required for character input by the mobile phone depicted in FIG. 1.

Additionally, as shown in FIG. 9, when "kanji" parts are inputted by handwriting character input and Arabic numerals are inputted by using keys, the total number of strokes including the key strokes and the writing strokes is 26. That is, the number of strokes is reduced to ½ as compared with the case that the characters are inputted by using only keys.

A description will now be given as to a case that alphabetic characters are inputted. It is to be noted that the display of the software key 244 is changed from "conversion" to "SPACE" which is used to input a space in this case.

Figure 10:
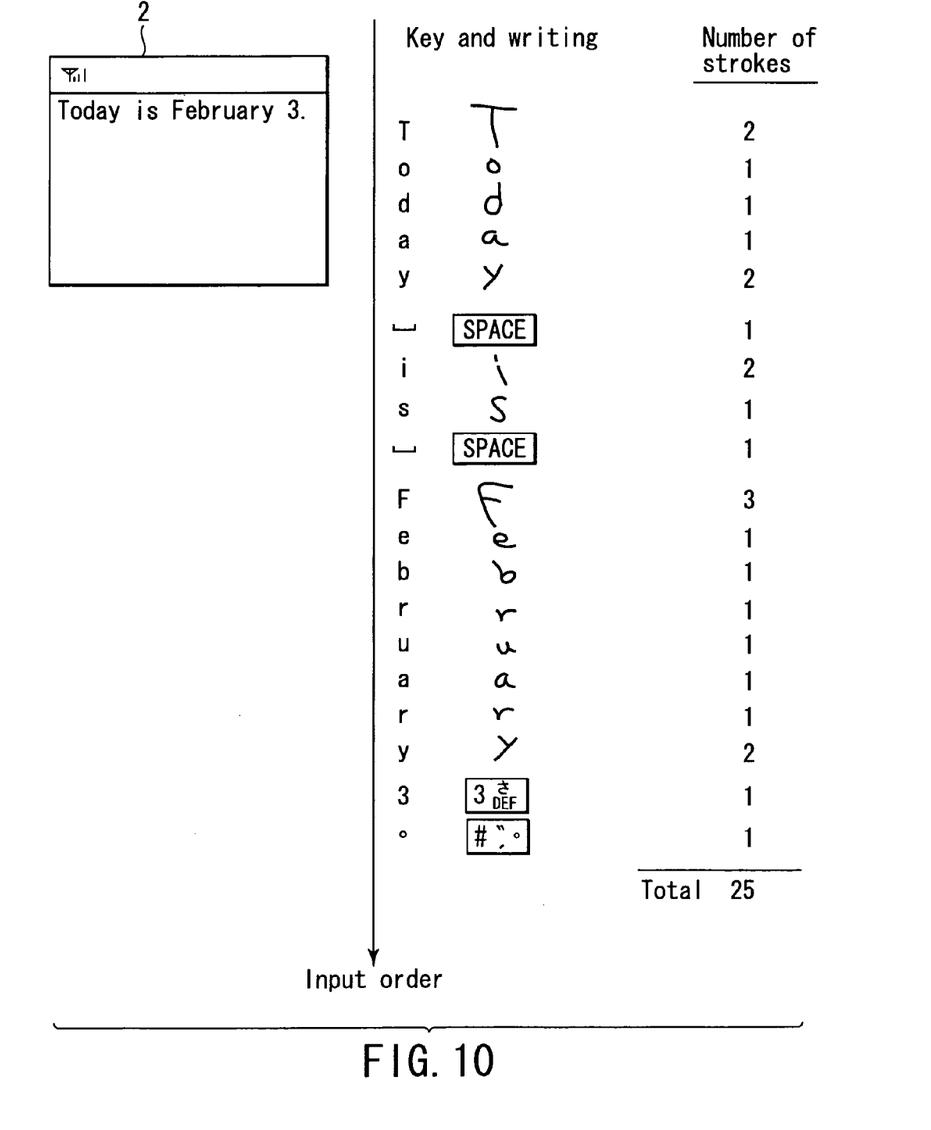
FIG. 10 is a view illustrating the number of strokes required for character input by the mobile phone depicted in FIG. 1.

First, FIG. 10 shows a user operation when alphabetic characters are inputted by handwriting and Arabic numerals are inputted by using keys. In this case, the total number of strokes including the writing strokes and the key strokes is 25.

Figure 11:
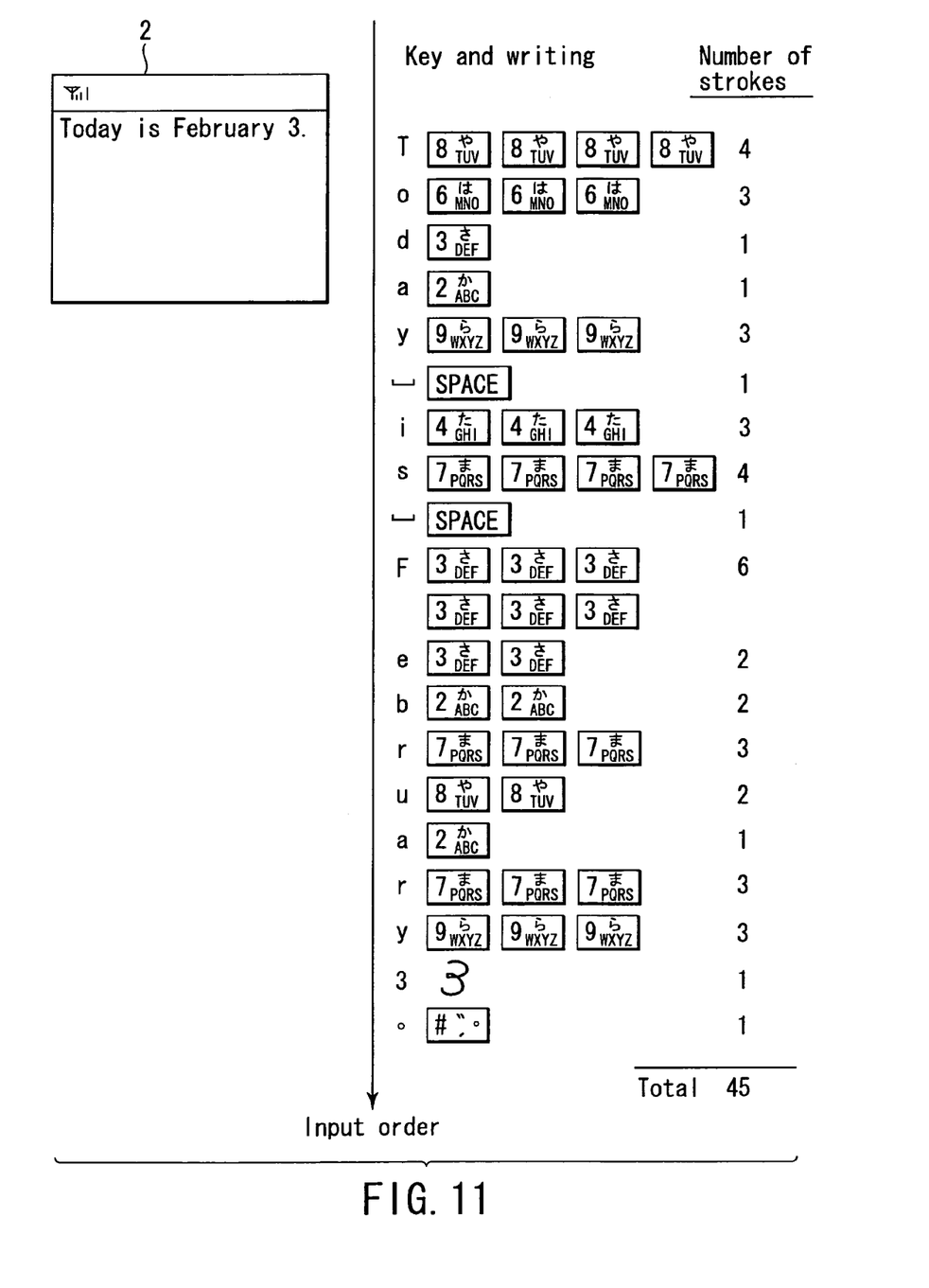
FIG. 11 is a view illustrating the number of strokes required for character input by the mobile phone depicted in FIG. 1.

On the other hand, FIG. 11 shows a user operation when alphabetic characters are inputted by using keys and Arabic numerals are inputted by handwriting. In this case, the total number of strokes including the key strokes and the writing strokes is 45.

As mentioned above, in the mobile phone having the above-described structure, a user can arbitrarily carry out the key input mode and the handwriting input mode, switching of the input mode can be automatically performed by effecting the key operation or the handwriting input, and an action for the mode switching is unnecessary.

Therefore, according to the mobile phone having the above-described structure, the character input based on the key operation and the character input based on drawing through the tablet can be both performed without switching them, and the convenience is very high, thereby greatly reducing the burden on a user at the time of character input.

Furthermore, since a user can input characters by using both the handwriting input and the key input according to needs, it is possible to change the input mode according to a purpose. For example, a complicated "kanji" character with many strokes is inputted in hiragana, and then it is converted into a "kanji" character.

Therefore, characters can be inputted by using both the handwriting character recognition and the keys according to needs without deteriorating advantages of both the character input based on the handwriting character recognition and the character input using the keys, thereby greatly improving the operability.

It is to be noted that the present invention is not restricted to the foregoing embodiment.

Although the description has been given as to the mobile phone as an example in the foregoing embodiment, the present invention can be applied to a portable information device or an information household electric appliance including a function to input characters such as a PDA (Personal Digital Assistant), a barcode reader, a POS (Point Of Sales) terminal and others.

Additionally, in regard to, e.g., the recognition mode when inputting characters, the character input mode using keys and the character data holding and processing mode, adopting conventionally proposed modes according to specifications can suffice.

Further, a light emitting diode, a cold cathode tube or a plasma tube may be used as the display device 2, and a moving body detection mode using an electrostatic type tablet or ultrasonic waves can be employed for the coordinate detecting unit 3.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A character input apparatus which generates character string data, comprising:
    key-in means for inputting a character by a keystroke;
    writing input means for inputting a character by writing;
    means for storing character strings;
    control means for controlling the storing means to store a first character input by the key-in means and a second character input by the writing input means in the storing means in a form of a single character string including the first character and the second character;
    a display device to display information; and
    display controlling means for controlling the display device to display a function key on the display device;
    the writing input means comprising:
    coordinate detecting means for detecting coordinates of an object input by the writing input means, the coordinate detecting means being laid on the display device; and
    handwriting detecting means for detecting a handwritten character based on the coordinates and,
    the control means executing a preset editing control with respect to the character string when the coordinate detecting means has detected a pressure applied to a position corresponding to the function key,
    display controlling means starting display of the function key when the coordinate detecting means has detected the writing after inputting a character by the keystroke.

2. The character input apparatus according to claim 1, wherein the key-in means includes a preset key and holding means for holding a character type inputted through the preset key, and when the writing input means accepts a character input and then a key operation for the key-in means is again performed, the key-in means accepts a character in the character type held by the holding means.

3. The character input apparatus according to claim 2, wherein the coordinate detecting means detects a coordinate to which an external pressure is applied.

4. A character input apparatus which generates character string data, comprising:
    key-in means for inputting a character by a keystroke;
    writing input means for inputting a character by writing;
    means for storing character strings;
    control means for controlling the storing means to store a first character input by the key-in means and a second character input by the writing input means in the storing means in a form of a single character string including the first character and the second character;
    a display device to display information; and
    display controlling means for controlling the display device to display a function key on the display device;
    the writing input means comprising:
    coordinate detecting means for detecting coordinates of an object input by the writing input means, the coordinate detecting means being laid on the display device; and
    handwriting detecting means for detecting a handwritten character based on the coordinates and,
    the control means executing a preset editing control with respect to the character string when the coordinate detecting means has detected a pressure applied to a position corresponding to the function key,
    the display controlling means terminates the display of the function key when the key-in means was operated after inputting a character through the writing inputting means.

5. The character input apparatus according to claim 4, wherein the key-in means includes a preset key and holding means for holding a character type inputted through the preset key, and when the writing input means accepts a character input and then a key operation for the key-in means is again performed, the key-in means accepts a character in the character type held by the holding means.

6. The character input apparatus according to claim 5, wherein the coordinate detecting means detects a coordinate to which an external pressure is applied.

7. A character input apparatus which generates character string data, comprising:
    a key-in unit configured to input a character by a keystroke;
    a writing input unit configured to input a character by writing;
    a storage configured to store character strings;
    a control unit configured to control the storage to store a first character input by the key-in unit and a second character input by the writing input unit in the storage in a form of a single character string including the first character and the second character;
    a display device to display information; and
    a display controlling unit configured to control the display device to display a function key on the display device;
    the writing input unit comprising:
    a coordinate detecting unit configured to detect coordinates of an object input by the writing input unit, the coordinate detecting unit being laid on the display device; and
    a handwriting detecting unit configured to detect a handwritten character based on the coordinates and,
    the control unit executing a preset editing control with respect to the character string when the coordinate detecting unit has detected a pressure applied to a position corresponding to the function key,
    the display controlling unit starting display of the function key when the coordinate detecting unit has detected the writing after inputting a character by the keystroke.

8. The character input apparatus according to claim 7, wherein the key-in unit includes a preset key and holding unit configured to hold a character type inputted through the preset key, and when the writing input unit accepts a character input and then a key operation for the key-in unit is again performed, the key-in unit accepts a character in the character type held by the holding unit.

9. The character input apparatus according to claim 8, wherein the coordinate detecting unit detects a coordinate to which an external pressure is applied.

10. A character input apparatus which generates character string data, comprising:
   a key-in unit configured to input a character by a keystroke;
   a writing input unit configured to input a character by writing;
   a storage configured to store character strings;
   a control unit configured to control the storage to store a first character input by the key-in unit and a second character input by the writing input unit in the storage in a form of a single character string including the first character and the second character;
   a display device to display information; and
   a display controlling unit configured to control the display device to display a function key on the display device;
   the writing input unit comprising:
   a coordinate detecting unit configured to detect coordinates of an object input by the writing input unit, the coordinate detecting unit being laid on the display device; and
   a handwriting detecting unit configured to detect a handwritten character based on the coordinates and,
   the control unit executing a preset editing control with respect to the character string when the coordinate detecting unit has detected a pressure applied to a position corresponding to the function key,
   the display control unit terminates the display of the function key when the key-in unit was operated after inputting a character through the writing inputting unit.

11. The character input apparatus according to claim 10, wherein the key-in unit includes a preset key and holding unit configured to hold a character type inputted through the preset key, and when the writing input unit accepts a character input and then a key operation for the key-in unit is again performed, the key-in unit accepts a character in the character type held by the holding unit.

12. The character input apparatus according to claim 11, wherein the coordinate detecting unit detects a coordinate to which an external pressure is applied.

* * * * *